US011941829B2

(12) United States Patent
Kobayakawa et al.

(10) Patent No.: US 11,941,829 B2
(45) Date of Patent: Mar. 26, 2024

(54) INFORMATION PROCESSING APPARATUS, LIGHT EMITTING DEVICE, AND NON-TRANSITORY COMPUTER READABLE MEDIUM STORING PROGRAM

(71) Applicant: FUJIFILM Business Innovation Corp., Tokyo (JP)

(72) Inventors: Shuhei Kobayakawa, Kanagawa (JP); Kiyofumi Aikawa, Kanagawa (JP); Daisuke Matsumoto, Kanagawa (JP); Kei Shimotani, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 445 days.

(21) Appl. No.: 16/885,284

(22) Filed: May 28, 2020

(65) Prior Publication Data

US 2021/0097708 A1 Apr. 1, 2021

(30) Foreign Application Priority Data

Oct. 1, 2019 (JP) ................. 2019-181540

(51) Int. Cl.
*G06T 7/514* (2017.01)
*F21V 23/00* (2015.01)
(Continued)

(52) U.S. Cl.
CPC ............. *G06T 7/514* (2017.01); *F21V 23/00* (2013.01); *F21V 23/003* (2013.01); *G01B 11/25* (2013.01);
(Continued)

(58) Field of Classification Search
CPC ..................................................... G06T 7/514
See application file for complete search history.

(56) References Cited

U.S. PATENT DOCUMENTS 6,231,185 B1 * 5/2001 Pipa ..................... G06T 7/514
351/208
2002/0051423 A1 * 5/2002 Hayashida ............. G11B 7/253
(Continued)

FOREIGN PATENT DOCUMENTS

JP H06167564 6/1994
JP 2007164506 6/2007
(Continued)

OTHER PUBLICATIONS

K. Hara, K. Nishino, & K. Ikeuchi, "Determining Reflectance and Light Position from a Single Image Without Distant Illumination Assumption", 9 IEEE Int'l Conf. on Computer Vision 560-567 (Oct. 2003) (Year: 2003).*

(Continued)

Primary Examiner — David N Werner
(74) Attorney, Agent, or Firm — JCIPRNET

(57) ABSTRACT

An information processing apparatus includes a processor configured to acquire an image obtained by imaging a space by one imaging device fixed in the space, specify, in the image, a two-dimensional coordinate of a bright spot indicating light emission of a light emitting device moving in the space, acquire output information output by the light emitting device, and specify a three-dimensional coordinate in the space of the light emitting device based on the output information and the two-dimensional coordinate.

6 Claims, 6 Drawing Sheets

(51) Int. Cl.
*G01B 11/25* (2006.01)
*G05D 25/00* (2006.01)
*G05D 25/02* (2006.01)
*G06T 7/521* (2017.01)
*G06T 7/55* (2017.01)
*H05B 47/105* (2020.01)
*H05B 47/135* (2020.01)
*H05B 47/14* (2020.01)

(52) U.S. Cl.
CPC ............ *G05D 25/00* (2013.01); *G05D 25/02* (2013.01); *G06T 7/521* (2017.01); *G06T 7/55* (2017.01); *H05B 47/105* (2020.01); *H05B 47/135* (2020.01); *H05B 47/14* (2020.01); *G06T 2207/10028* (2013.01)

(56) References Cited

U.S. PATENT DOCUMENTS

| | | | | |
|---|---|---|---|---|
| 2003/0128207 | A1* | 7/2003 | Sawada | G06T 7/514 |
| | | | | 345/419 |
| 2012/0207404 | A1* | 8/2012 | Robles-Kelly | G06T 7/514 |
| | | | | 382/286 |
| 2015/0156423 | A1 | 6/2015 | Lundberg | |
| 2015/0371393 | A1* | 12/2015 | Ramachandra | G06T 7/514 |
| | | | | 382/154 |
| 2016/0202039 | A1* | 7/2016 | Colle | G01B 11/25 |
| | | | | 356/369 |
| 2016/0349046 | A1* | 12/2016 | Tin | G06T 7/514 |
| 2017/0046819 | A1* | 2/2017 | Sambongi | G06T 7/514 |
| 2017/0302902 | A1* | 10/2017 | Martinello | H04N 13/254 |
| 2018/0013988 | A1* | 1/2018 | Kondo | H04N 9/646 |
| 2018/0046854 | A1* | 2/2018 | Kittler | G06V 40/165 |

FOREIGN PATENT DOCUMENTS

| | | |
|---|---|---|
| JP | 2015109641 | 6/2015 |
| JP | 2019066347 | 4/2019 |

OTHER PUBLICATIONS

"Office Action of Japan Counterpart Application", dated Jun. 6, 2023, with English translation thereof, p. 1-p. 5.

* cited by examiner

INFORMATION PROCESSING APPARATUS, LIGHT EMITTING DEVICE, AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2019-181540 filed Oct. 1, 2019.

BACKGROUND

(i) Technical Field

The present invention relates to an information processing apparatus, a light emitting device, and a non-transitory computer readable medium storing a program.

(ii) Related Art

There is a system for detecting a light emitting device called a so-called light emitting tag or the like, which includes an element emitting light (called a light emitting element) and a circuit for controlling the light emission. In this system, a tag including the light emitting tag provided with a light emitting element on an article existing in space is pasted, and the space is imaged by an imaging device such as a digital still camera. Then, an information processing apparatus of the system grasps the relative position of the article with respect to the imaging device from the light of the light emitting element included in the obtained image. The system is used, for example, in a factory, a warehouse, or the like to manage the handled articles.

By the way, the image captured by the system is two-dimensional information and does not have depth information. For example, in the three-dimensional space, in a case where a plurality of tags are arranged on radiation around a point in which the imaging device receives the light, the light emitted by the light emitting tag is imaged in an overlapping manner. Therefore, each position of the plurality of light emitting tags in the three-dimensional space is not specified only from an image captured by one imaging device.

Therefore, a three-dimensional coordinate of a target is required to be specified from a two-dimensional coordinate of the target obtained by imaging the target such as the light emitting tag fixed to the article. For example, JP1994-167564A discloses a positioning method in which a linear equation passing through a target and the center of a vision surface of the imaging device are obtained respectively from each fisheye image provided by a plurality of imaging devices using a fisheye lens, and the three-dimensional coordinate of the target is determined using an intersection point of the linear equation.

SUMMARY

However, preparing a plurality of imaging devices is costly.

Aspects of non-limiting embodiments of the present disclosure relate to an information processing apparatus, a light emitting device, and a non-transitory computer readable medium storing a program that one imaging device installed in space adds other information to an image obtained by imaging the space and specifies a position in a three-dimensional space of light emitting device moving in the space.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a processor configured to acquire an image obtained by imaging a space by one imaging device fixed in the space, specify, in the image, a two-dimensional coordinate of a bright spot indicating light emission of a light emitting device moving in the space, acquire output information output by the light emitting device, and specify a three-dimensional coordinate in the space of the light emitting device from the output information and the two-dimensional coordinate.

BRIEF DESCRIPTION OF THE DRAWINGS

Exemplary embodiment(s) of the present invention will be described in detail based on the following figures, wherein.

DETAILED DESCRIPTION

Exemplary Embodiment

Configuration of Information Processing System

Figure 1:
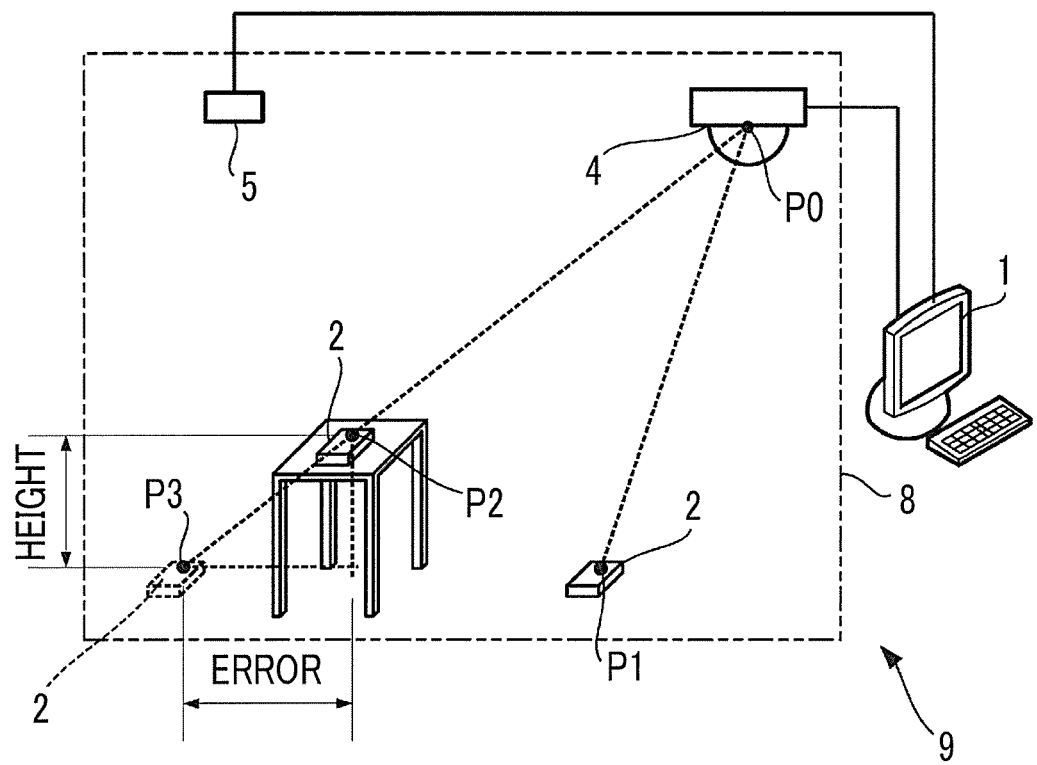
FIG. 1 is a diagram showing an example of an overall configuration of an information processing system 9.

FIG. 1 is a diagram showing an example of an overall configuration of an information processing system 9. The information processing system 9 includes an information processing apparatus 1, a light emitting tag 2, and an imaging device 4. In addition, the information processing system 9 shown in FIG. 1 includes a first atmospheric pressure sensor 5.

The information processing apparatus 1 is an information processing apparatus such as a personal computer.

The light emitting tag 2 is a light emitting device that includes a light emitting element and a circuit that controls the light emission. The light emitting tag 2 has, for example, a shape such as a tag, is attached to an article movable in space 8 to emit light, and transmits a position of the article to the surroundings. The information processing system 9 shown in FIG. 1 is configured on the assumption that a plurality of light emitting tags 2 exist in the space 8. Here, the space 8 is, for example, space such as a factory or a warehouse, and the articles are, for example, tools used and managed in the factory, objects to be processed, goods stored in the warehouse, evidence, and the like.

One imaging device 4 is installed in the space 8, and is a digital still camera, a video camera, or the like that images the space 8. The imaging device 4 includes, for example, a wide-angle lens directed to the space 8 and an imaging element such as a charge coupled device (CCD) image sensor or a complementary metal oxide semiconductor (CMOS) image sensor that converts light captured by the wide-angle lens into an electric signal.

Further, the imaging device 4 includes, for example, a processor that controls the imaging element to generate image data from an electric signal, and a memory that stores the generated image data. The processor of the imaging device 4 may correct the generated image data by methods such as an equidistant projection method, an equal solid angle projection method, and an orthographic projection method.

The imaging device 4 is communicably connected to the information processing apparatus 1 by wire communication or wireless communication.

The imaging device 4 shown in FIG. 1 images the space 8 a plurality of times, for example, periodically. Then, the imaging device 4 transmits a plurality of images captured respectively at different times to the information processing apparatus 1.

The first atmospheric pressure sensor 5 is a sensor that is fixed to the space 8 and measures the atmospheric pressure. The atmospheric pressure measured by the first atmospheric pressure sensor 5 changes according to a height of a position where the first atmospheric pressure sensor 5 is fixed. Here, the height refers to a position along the direction of gravity. In the space 8, a difference between a height at which the first atmospheric pressure sensor 5 is fixed and a height at which the imaging device 4 is fixed is known. That is, the atmospheric pressure measured by the first atmospheric pressure sensor 5 is, for example, converted into the height at which the first atmospheric pressure sensor 5 is fixed in the space 8 or the height at which the imaging device 4 is fixed by performing a determined operation or the like.

In addition, the first atmospheric pressure sensor 5 is communicably connected to the information processing apparatus 1 by wire communication or wireless communication.

The information processing system 9 shown in FIG. 1 assumes that the plurality of light emitting tags 2 exist in the space 8. The light emitting tag 2 is movable in the space 8 in the height direction as well as in the horizontal direction. For example, in FIG. 1, a point P1 and a point P3 are points on the floor of the space 8. On the other hand, in FIG. 1, a point P2 is a point on a top plate of a table installed on the floor of the space 8.

As shown in FIG. 1, the light emitting tag 2 located at the point P2 are arranged along with the light emitting tag 2 located at the point P3 on radiation centered on a point P0 at which the imaging device 4 receives the light. Accordingly, in a case where the imaging device 4 images the light emitting tag 2, the light emitted from the two light emitting tags 2 is imaged in an overlapping manner, so that the two light emitting tags 2 cannot be distinguished from the captured image.

Further, for example, actually, even in a case where the light emitting tag 2 located at the point P2 is imaged, the position of the light emitting tag 2 is specified as the point P3 assuming that the light emitting tag 2 is placed on the floor. In this case, in the three-dimensional coordinate of the light emitting tag 2, a deviation of a table height occurs along the height direction, and an error corresponding to the table height occurs along a plane perpendicular to the height direction.

Therefore, in the information processing system 9 shown in FIG. 1, the information processing apparatus 1 specifies the three-dimensional coordinate of the light emitting tag 2 by using output information output by the light emitting tag 2 in addition to the two-dimensional coordinate of the light emitting tag 2 specified from the image acquired from the imaging device 4.

The information processing apparatus 1 may be connected to the imaging device 4, the first atmospheric pressure sensor 5, and both of the imaging device 4 and the first atmospheric pressure sensor 5 via a communication line such as a local area network (LAN), a wide area network (WAN), or the internet.

Configuration of Information Processing Apparatus

Figure 2:
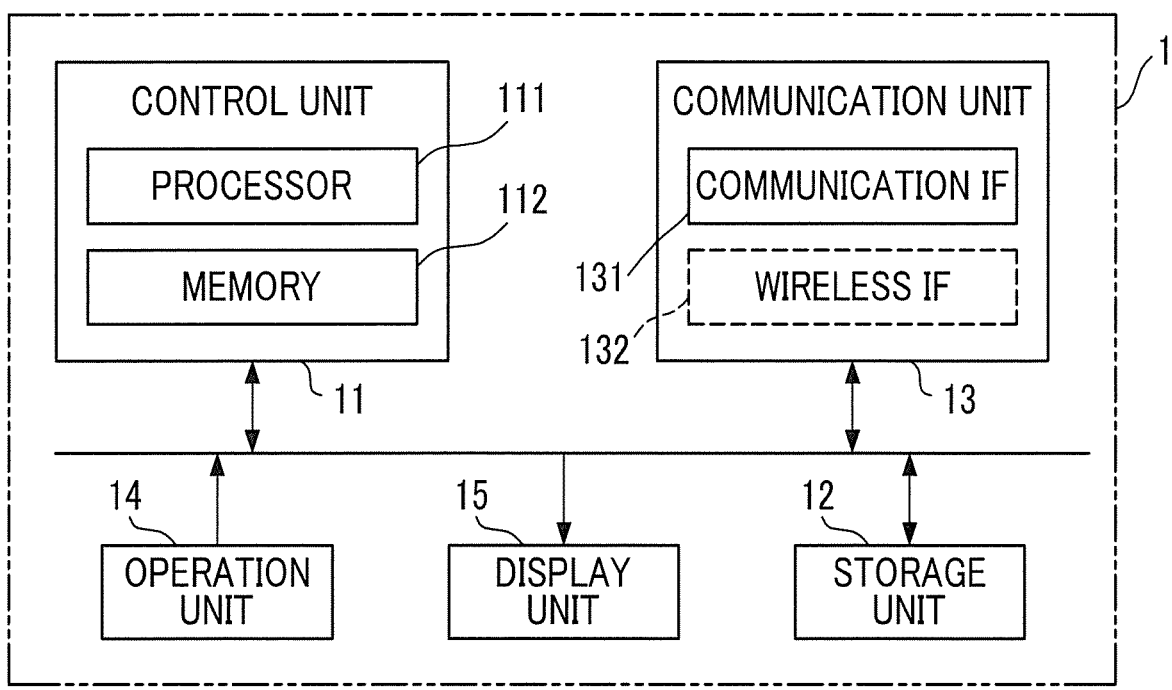
FIG. 2 is a diagram showing an example of a configuration of an information processing apparatus 1.

FIG. 2 is a diagram showing an example of a configuration of the information processing apparatus 1. The information processing apparatus 1 shown in FIG. 2 includes a control unit 11, a storage unit 12, a communication unit 13, an operation unit 14, and a display unit 15. The configurations are communicably connected to each other by, for example, a bus.

The control unit 11 includes a processor 111 and a memory 112. In addition, the control unit 11 may include a read only memory (ROM). The processor 111 controls each unit of the information processing apparatus 1 by reading out a computer program (hereinafter, simply referred to as a program) stored in the ROM or the storage unit 12 into the memory 112 and executing the computer program. The processor 111 is, for example, a central processing unit (CPU). The memory 112 is, for example, a random access memory (RAM).

The communication unit 13 includes a communication IF 131. The communication IF 131 is a communication interface, and includes a circuit that performs communication control for communicably connecting the information processing apparatus 1 to another apparatus by wire communication or wireless communication. The communication IF 131 shown FIG. 2 is connected to the imaging device 4 and the first atmospheric pressure sensor 5 shown in FIG. 1 by a signal line and the like. The communication IF 131 receives data of an image obtained by imaging the space 8 from the imaging device 4 and data of an atmospheric pressure at a determined position in the space 8 from the first atmospheric pressure sensor 5 via the signal line and the like, respectively.

The operation unit 14 includes operation elements such as an operation button, a keyboard, a touch panel, and a mouse for performing various instructions. Then, the operation unit 14 receives an operation and sends a signal corresponding to the operation content to the control unit 11. The operation is, for example, a press on the keyboard or a gesture on the touch panel.

The display unit 15 has a display screen such as a liquid crystal display, and displays an image under the control of the control unit 11. On the display screen, a transparent touch panel of the operation unit 14 may be arranged in an overlapping manner. The information processing apparatus 1 may not include the operation unit 14 and the display unit 15.

The storage unit 12 is a storage means such as a solid state drive or a hard disk drive, and stores an operating system, various programs, data, and the like read by the processor 111 of the control unit 11.

Tag Configuration

Figure 3:
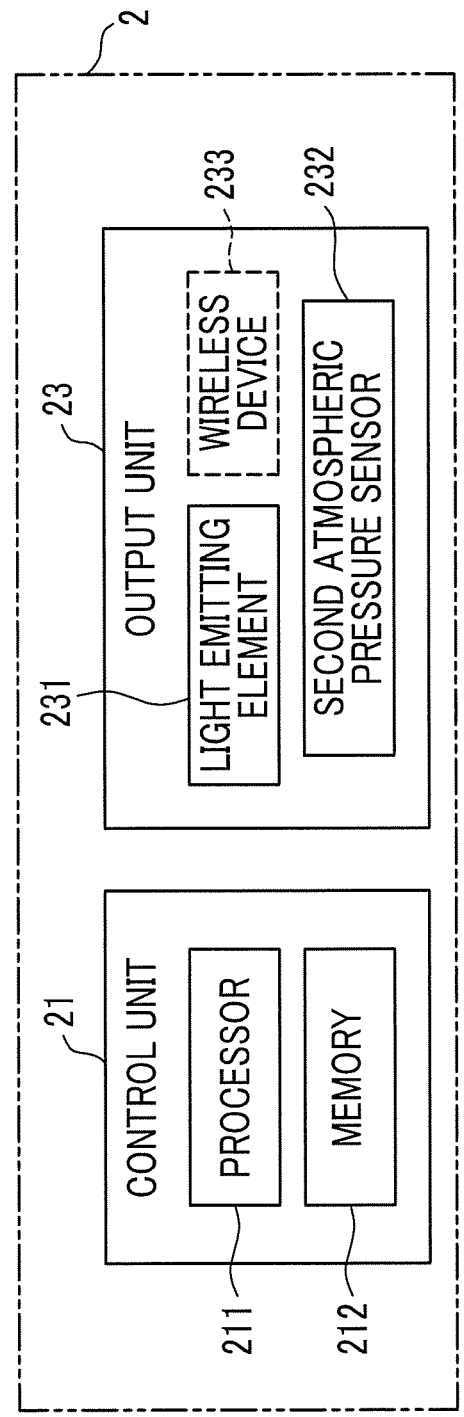
FIG. 3 is a diagram showing an example of a configuration of a light emitting tag 2.

FIG. 3 is a diagram showing an example of a configuration of a light emitting tag 2. The light emitting tag 2 includes a control unit 21 and an output unit 23.

The control unit 21 includes a processor 211 and a memory 212. In addition, the control unit 21 may include the storage unit such as a solid state drive or a ROM. The processor 211 controls each unit of the light emitting tag 2 by reading out a program stored in the ROM or the storage unit into the memory 212 and executing the program. The processor 211 is, for example, a CPU. The memory 212 is, for example, a RAM.

The output unit 23 includes a light emitting element 231 and a second atmospheric pressure sensor 232. The output unit 23 is an example of an output unit having a light emitting element that outputs output information by light emission. The light emitting element 231 is an element that emits light under the control of the processor 211, and is, for example, a light emitting diode (LED) or the like. The timing and length of the light emission of the light emitting element 231 are controlled by the processor 211. In addition, the light emitting element 231 may have a configuration in which an emission wavelength can be controlled by the processor 211.

The second atmospheric pressure sensor 232 is a atmospheric pressure sensor that measures an atmospheric pressure around the light emitting tag 2. Accordingly, the output unit 23 is an example of an output unit that is provided in a tag and has the second atmospheric pressure sensor that measures the atmospheric pressure around the tag.

As described above, the atmospheric pressure changes according to a height. Therefore, the atmospheric pressure measured by the second atmospheric pressure sensor 232 is converted into a height of the light emitting tag 2 in which the second atmospheric pressure sensor 232 is fixed in the space 8 by performing a determined operation or the like. The height of the light emitting tag 2 is an example of information corresponding to a position of the light emitting tag 2 in the space 8.

The processor 211 causes the light emitting element 231 to emit light according to the atmospheric pressure measured by the second atmospheric pressure sensor 232. That is, the output unit 23 controlled by the processor 211 is an example of an output unit that outputs output information corresponding to the position of the light emitting device in space. The processor 211 is an example of a processor that causes a light emitting element to emit light according to output information.

The light emitting element 231 may emit light according to a pattern corresponding to the atmospheric pressure measured by the second atmospheric pressure sensor 232. In this case, the processor 211 that causes the light emitting element 231 to emit light is an example of a processor that causes the light emitting element to emit light in a pattern corresponding to the output information.

In addition, the light emitting element 231 may be caused to emit light at a wavelength corresponding to the atmospheric pressure measured by the second atmospheric pressure sensor 232. In this case, the processor 211 that causes the light emitting element 231 to emit light is an example of a processor that causes the light emitting element to emit the light having a wavelength corresponding to the output information.

The processor 211 may output data other than the above-described atmospheric pressure by controlling the light emission of the light emitting element 231. For example, in a case where a plurality of light emitting tags 2 exist in the space 8 and the information processing apparatus 1 needs to identify the plurality of light emitting tags 2, the processor 211 of each light emitting tag 2 may, for example, cause the light emitting element 231 to emit light according to the identification information for identifying the light emitting tag 2 stored in the memory 212. In this case, the light emitting element 231 may emit light in a pattern corresponding to a signal obtained by encoding the identification information of the light emitting tag 2, or may emit light at a wavelength corresponding to the signal. In this case, the processor 211 that causes the light emitting element 231 to emit light is an example of a processor that causes the light emitting element to emit light according to the identification information indicating the light emitting device.

Functional Configuration of Information Processing Apparatus

Figure 4:
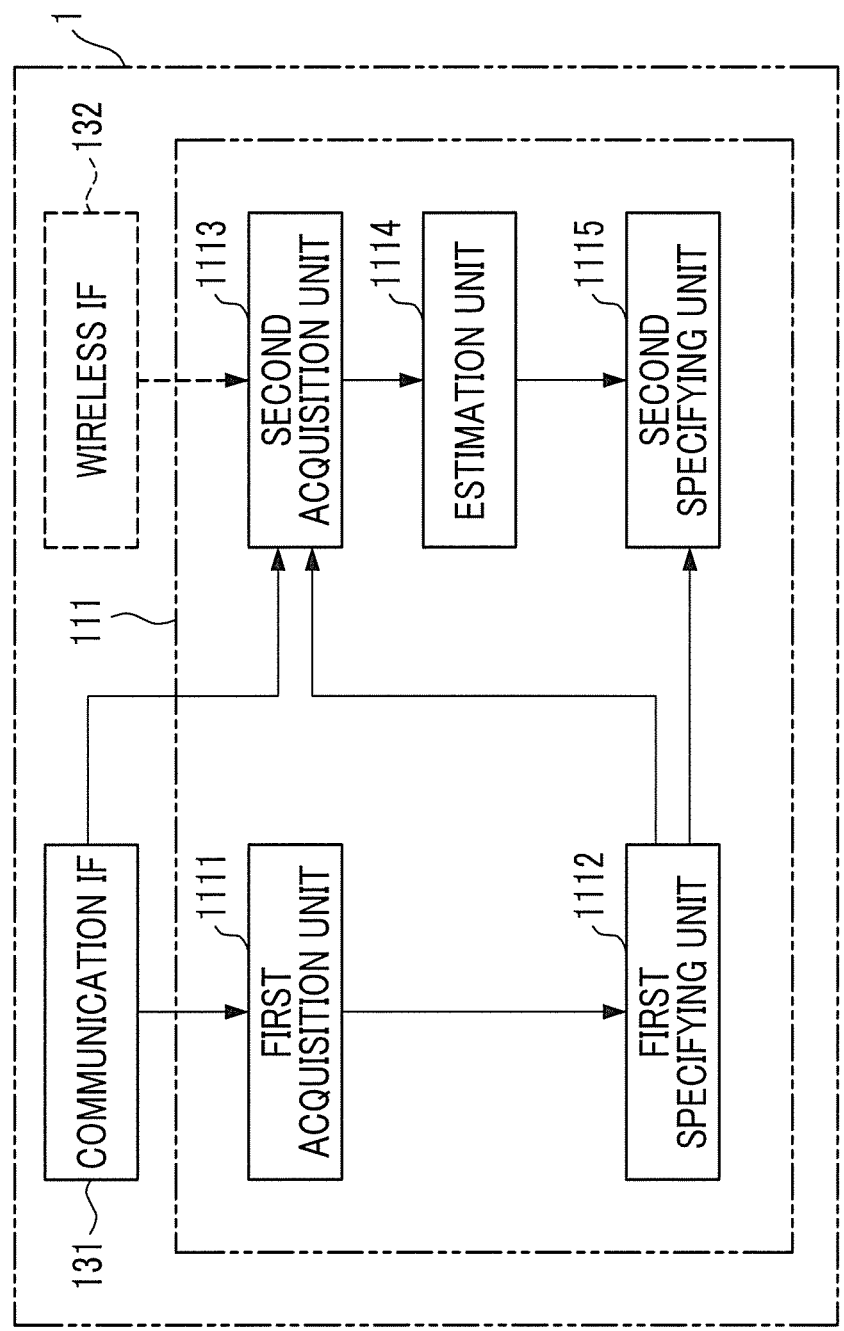
FIG. 4 is a diagram showing an example of a functional configuration of the information processing apparatus 1.

FIG. 4 is a diagram showing an example of a functional configuration of the information processing apparatus 1. The control unit 11 of the information processing apparatus 1 functions as a first acquisition unit 1111, a first specifying unit 1112, a second acquisition unit 1113, an estimation unit 1114, and a second specifying unit 1115 by causing the processor 111 to read the program stored in the storage unit 12 into the memory 112 and execute the program.

The first acquisition unit 1111 acquires an image of the space 8 imaged by the imaging device 4 (not shown in FIG. 4) via the communication IF 131. That is, the processor 111 functioning as the first acquisition unit 1111 is an example of a processor that acquires an image of the space imaged by one imaging device fixed in the space. In a case where the imaging device 4 images the space 8 a plurality of times, the first acquisition unit 1111 acquires a plurality of images that are imaged respectively at different times. In this case, the processor 111 functioning as the first acquisition unit 1111 is an example of a processor that acquires a plurality of images of the space imaged respectively by the imaging device at different times.

The light emitting tag 2 moves in the space 8, and the light emitting tag 2 may emit light. Accordingly, the image captured by the imaging device 4 may include the light emitting tag 2 in a case of emitting light, and the light emission of the light emitting tag 2 is a bright spot in the image. Here, the "image" is rectangular visual information configured with a plurality of pixels arranged vertically and horizontally in a grid pattern. In addition, the "bright spot" here is an area configured with one or more pixels having a brightness more than a threshold value as compared with surrounding pixels in the image.

The first specifying unit 1112 specifies a two-dimensional coordinate of the bright spot indicating the light emission of the light emitting tag 2 moving in the space 8 in the image acquired by the first acquisition unit 1111. That is, the processor 111 functioning as the first specifying unit 1112 is an example of a processor that specifies the two-dimensional coordinate of the bright spot indicating the light emission of the light emitting device moving in the space in the acquired image.

In addition, the first specifying unit 1112 shown in FIG. 4 specifies output information corresponding to the light emission from the image obtained by imaging the light emission of the light emitting tag 2.

The output information is data of the atmospheric pressure measured by the second atmospheric pressure sensor 232 included in the output unit 23 of the light emitting tag 2. The first specifying unit 1112 specifies, for example, a light emission pattern indicated by the bright spot from a plurality of images acquired by the first acquisition unit 1111 and specifies output information such as the data of the atmospheric pressure on the basis of the pattern. In this case, the processor 111 functioning as the first specifying unit 1112 is an example of a processor that acquires output information indicated by the light emission pattern from the plurality of acquired images.

In addition, the first specifying unit 1112 may specify an emission wavelength indicated by the bright spot from the image acquired by the first acquisition unit 1111 and may specify the output information such as the data of the atmospheric pressure on the basis of the wavelength.

The first specifying unit 1112 may further specify identification information of the light emitting tag 2 that emits light from the image acquired by the first acquisition unit 1111. The first specifying unit 1112 may provide the second acquisition unit 1113 in association with the two-dimensional coordinate of the light emitting tag 2 that emits light or the output information indicated by the light emission and the identification information.

The second acquisition unit 1113 acquires the output information specified by the first specifying unit 1112. That is, the processor 111 functioning as the second acquisition unit 1113 is an example of a processor that acquires output information output by the output unit provided in the light emitting device. In addition, the processor 111 functioning as the first specifying unit 1112 shown in FIG. 4 is an example of a processor that acquires the output information from an image obtained by imaging light emission of a light emitting element.

For example, the second acquisition unit 1113 shown in FIG. 4 acquires the data of the atmospheric pressure measured by the first atmospheric pressure sensor 5 (not shown in FIG. 4) via the communication IF 131, and acquires the data of the atmospheric pressure measured by the second atmospheric pressure sensor 232 from the first specifying unit 1112.

The estimation unit 1114 calculates a difference between the atmospheric pressures measured respectively by the first atmospheric pressure sensor 5 and the second atmospheric pressure sensor 232, and estimates the height of the light emitting tag 2 on the basis of the difference. That is, the processor 111 functioning as the estimation unit 1114 is an example of a processor that estimates the height of the light emitting device on the basis of the difference between the atmospheric pressures measured respectively by the first atmospheric pressure sensor and the second atmospheric pressure sensor.

The second specifying unit 1115 specifies the three-dimensional coordinate of the light emitting tag 2 in the space 8 from the output information acquired by the second acquisition unit 1113 and the two-dimensional coordinate of the bright spot indicating the light emission of the light emitting tag 2 specified by the first specifying unit 1112. That is, the processor 111 functioning as the second specifying unit 1115 is an example of a processor that specifies three-dimensional coordinate in the space of the light emitting device from the output information and the two-dimensional coordinate.

Operation of Information Processing Apparatus

Figure 5:
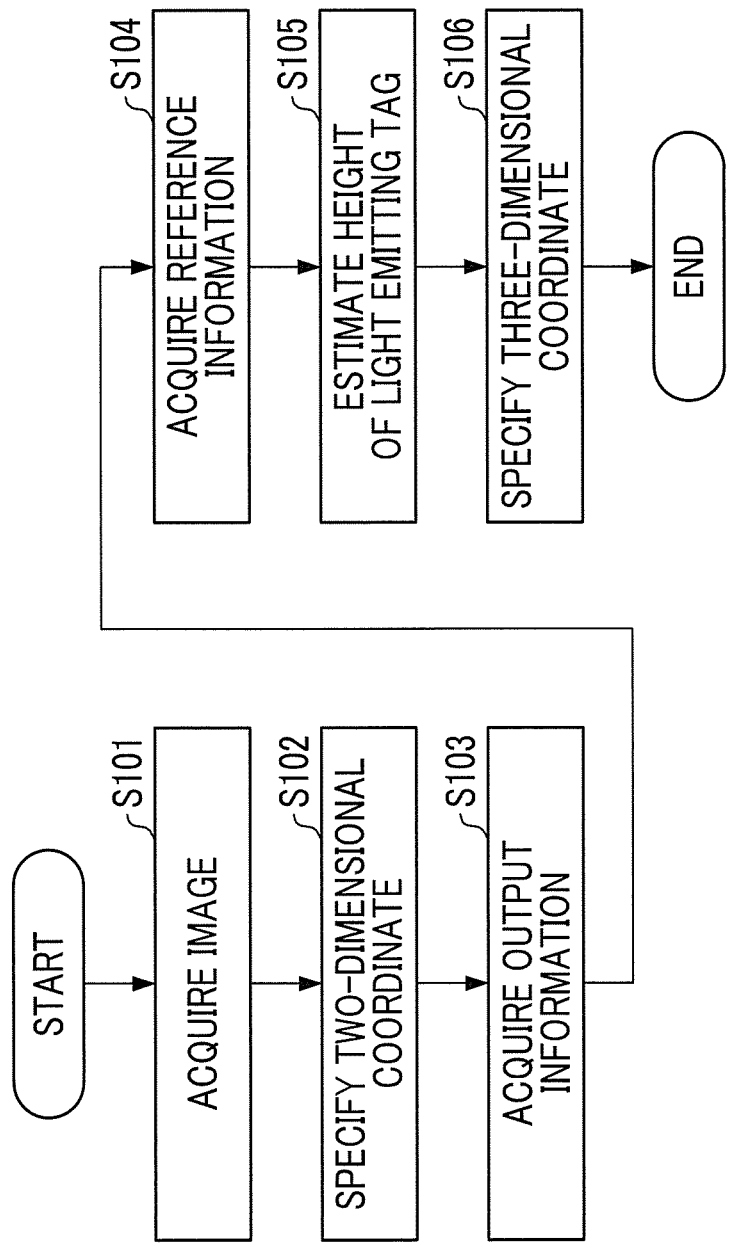
FIG. 5 is a flow diagram showing an example of an operation flow in which the information processing apparatus 1 specifies a three-dimensional coordinate of the light emitting tag 2.

FIG. 5 is a flow diagram showing an example of an operation flow in which the information processing apparatus 1 specifies a three-dimensional coordinate of the light emitting tag 2. In the information processing apparatus 1, the processor 111 of the control unit 11 acquires an image of the space 8 imaged by the imaging device 4 (step S101), and specifies a two-dimensional coordinate of a bright spot indicating light emission of the light emitting tag 2 moving in the space 8 in the image (step S102).

In addition, the processor 111 acquires the output information output by the output unit 23 provided in the light emitting tag 2 (step S103), and acquires information of reference (referred to as reference information) required for estimating a height of the light emitting tag 2 from the output information (step S104).

Here, the output information acquired by the processor 111 in step S103 is information output by causing the light emitting element 231 to emit light in a pattern corresponding to the data of the atmospheric pressure measured by the second atmospheric pressure sensor 232 of the output unit 23 by the processor 211 of the light emitting tag 2.

The processor 111 has acquired a plurality of images in step S101. The processor 111 specifies the light emission pattern of the light emitting tag 2 on the basis of a timing and a period in which the bright spot indicating the light emission of the light emitting tag 2 appears in the plurality of acquired images, and acquires data of the atmospheric pressure indicated by the pattern, that is, output information.

Reference information acquired by the processor 111 in step S104 is information transmitted from the first atmospheric pressure sensor 5 to the control unit 11 via the communication unit 13, and is data of the atmospheric pressure measured by the first atmospheric pressure sensor 5.

The processor 111 estimates the height of the light emitting tag 2 in the space 8 using the output information acquired in step S103 and the reference information acquired in step S104 (step S105). For example, the processor 111 calculates a difference between the atmospheric pressure around the light emitting tag 2 indicated by the output information and the atmospheric pressure around the first atmospheric pressure sensor 5 indicated by the reference information. Then, the processor 111 converts the calculated difference into the height using a predetermined operation expression. Thereby, the height of the light emitting tag 2 with respect to a position of the first atmospheric pressure sensor 5 is estimated.

In a case where each height of the first atmospheric pressure sensor 5 and the imaging device 4 is different, the memory 112 stores the difference in height between the first atmospheric pressure sensor 5 and the imaging device 4 in advance. In this case, the processor 111 may estimate the height of the light emitting tag 2 with respect to the position of the imaging device 4 using the difference read out from the memory 112.

Then, the processor 111 specifies the three-dimensional coordinate of the light emitting tag 2 in the space 8 by applying the height of the light emitting tag 2 estimated in step S105 to the two-dimensional coordinate of the light emitting tag 2 specified in step S102 (step S106).

Figure 6:
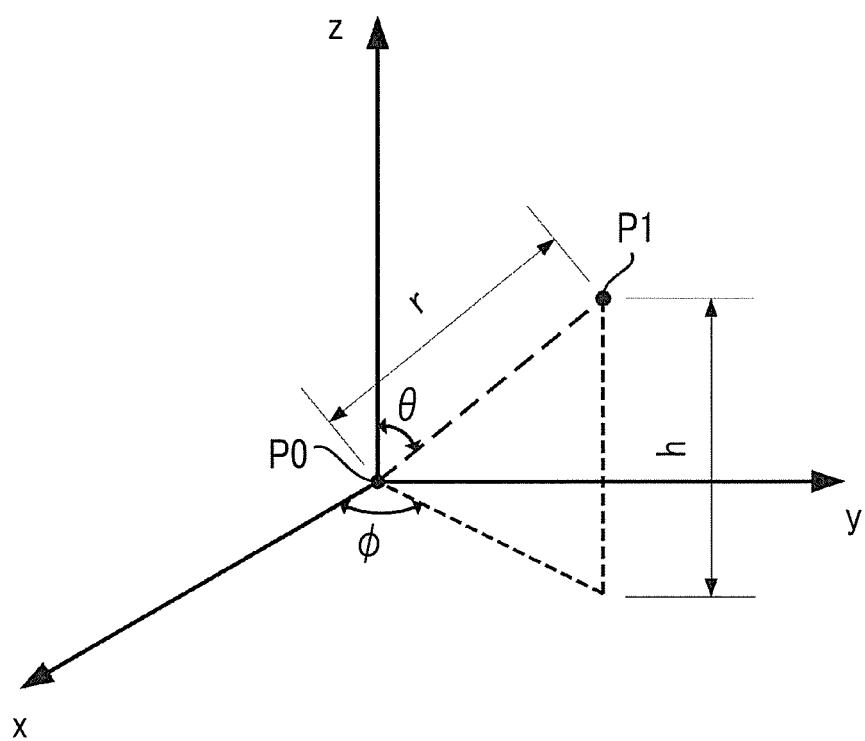
FIG. 6 is a diagram for explaining the three-dimensional coordinate.
Figure 7:
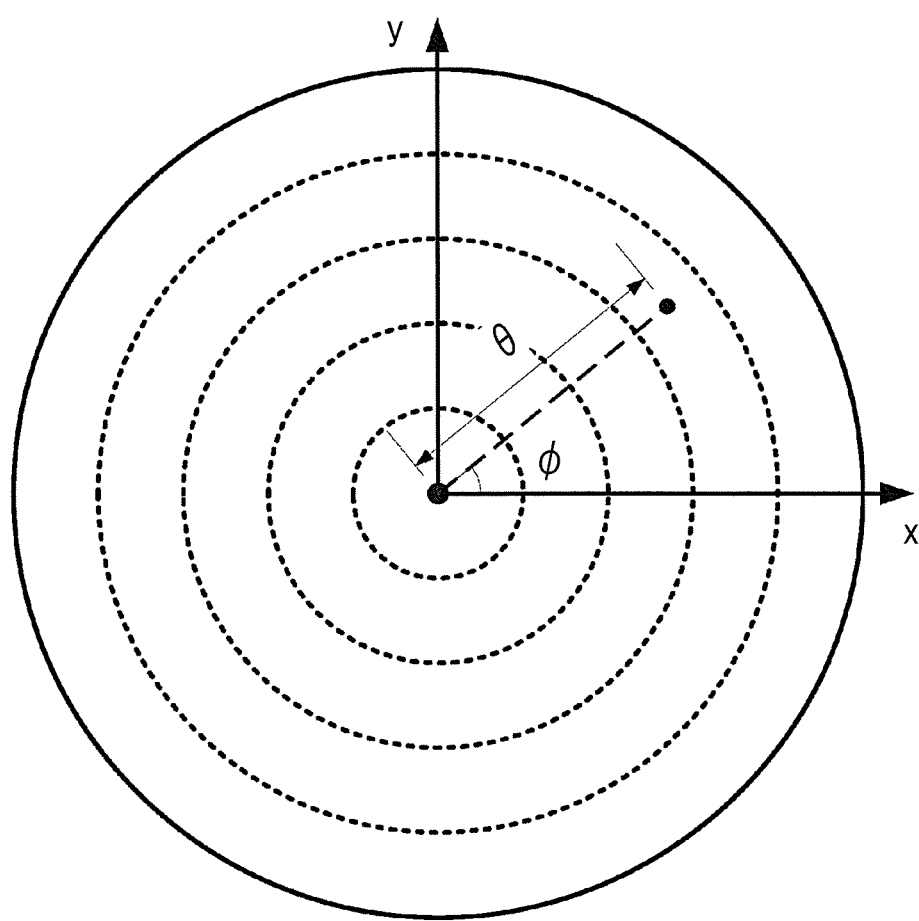
FIG. 7 is a diagram for explaining a two-dimensional coordinate.

The three-dimensional coordinates are specified, for example, as follows. FIG. 6 is a diagram for explaining the three-dimensional coordinate. FIG. 7 is a diagram for explaining a two-dimensional coordinate.

In FIG. 6, space such as the space 8 is represented as an xyz right-handed coordinate space. The point P0 is a center point of a wide-angle lens of the imaging device 4 shown in FIG. 1. The point P1 is a point where the light emitting element 231 of the light emitting tag 2 is located. In FIG. 6, the +z direction is upward, but as shown in FIG. 1, in a case where the imaging device 4 images the lower side, the +z direction is the direction of gravity.

In the three-dimensional coordinates centered on the point P0, the coordinate of the point P1 is expressed by the following [Formula 1]. Here, r is a distance between the point P0 and the point P1, θ is an angle of the point P1 with respect to a z-axis, and φ is an angle of the point P4 obtained by projecting the point P1 onto an xy plane with respect to an x-axis.

[Formula 1]

$x = r \cdot \sin\theta \cdot \sin\varphi$ $y = r \cdot \sin\theta \cdot \cos\varphi$ $z = r \cdot \cos\theta$ (1)

On the other hand, in a case where an image captured by the imaging device 4 is represented by the equidistant projection method, the distance from the center to the bright spot corresponds to θ shown in FIG. 6, as shown in FIG. 7. In addition, an angle of the bright spot with respect to the x-axis corresponds to φ shown in FIG. 6. In the captured image, only two components, θ and φ, of the three-dimensional coordinates of the light emitting tag 2 are shown, and r is unknown.

On the other hand, as shown in FIG. 6, in a case where a height difference h between the point P0 and the point P1 is determined from the measurement of the atmospheric pressure or the like, the above-described r is specified using the difference h and the two-dimensional coordinates (θ, φ) specified from the captured image. In this case, since z=h, the following [Formula 2] is obtained by substituting h into z of the above-described [Formula 1]. The processor 111 of the information processing apparatus 1 specifies three-dimensional coordinates (x, y, z) of the light emitting tag 2 on the basis of the [Formula 2].

[Formula 2]

$x = h \cdot \tan\theta \cdot \sin\varphi$ $y = h \cdot \tan\theta \cdot \cos\varphi$ $z = h$ (2)

By the above-described operation, the processor 111 specifies the three-dimensional coordinate of the light emitting tag 2 in the space 8 from the images captured by the imaging device 4 fixed in the space 8 and the output information output by the output unit 23 provided in the light emitting tag 2. As a result, even in a case where only one imaging device 4 can be installed, since the three-dimensional coordinate of the light emitting tag 2 is specified, the position of the light emitting tag 2 movably accommodated in the space 8 is grasped by an user of the information processing system 9.

Modification Example

The above is the description of the exemplary embodiment, but the contents of the exemplary embodiment can be modified as follows. Further, the following modification examples may be combined.

<1>

In the above-described exemplary embodiment, the processor 211 of the light emitting tag 2 causes the output unit 23 to output the atmospheric pressure measured by the second atmospheric pressure sensor 232 as the output information, but the output information that the processor 211 outputs to the output unit 23 is not limited to thereto. For example, in a case where the space 8 has a temperature gradient in which a temperature changes depending on the position, the processor 211 may output the temperature measured by a thermometer to the output unit 23 as the output information. In this case, the output unit 23 only needs to have the above-described thermometer.

In addition to the atmospheric pressure sensor and the thermometer, the output unit 23 may output the output information on the position of the light emitting tag 2 using a measuring device that measures a physical quantity at which a gradient occurs in the space 8. Physical quantity to be measured includes, for example, sound, humidity, vibration, magnetic field, concentration, electromagnetic coupling, and the like in addition to the above-described atmospheric pressure and temperature.

<2>

In the above-described exemplary embodiment, the processor 111 functions as the estimation unit 1114 that calculates a difference between the atmospheric pressures measured respectively by the first atmospheric pressure sensor 5 and the second atmospheric pressure sensor 232, and estimates the height of the light emitting tag 2 on the basis of the difference. However, in a case where the atmospheric pressure measured by the first atmospheric pressure sensor 5 hardly fluctuates, the estimation unit 1114 may estimate the height of the light emitting tag 2 only from the atmospheric pressure measured by the second atmospheric pressure sensor 232. In this case, the information processing system 9 may not have the first atmospheric pressure sensor 5.

<3>

In the above-described exemplary embodiment, the output unit 23 includes the light emitting element 231 and the second atmospheric pressure sensor 232, but may include a wireless device 233 as shown by a broken line in FIG. 3. The wireless device 233 is a device that transmits and receives a wireless signal by so-called short-range wireless communication in accordance with, for example, standards such as IEEE 802.15.

In this case, the communication unit 13 of the information processing apparatus 1 may include a wireless IF 132 that is a wireless interface as shown by a broken line in FIG. 2. The wireless IF 132 is an interface that receives the wireless signal transmitted by the wireless device 233 and transmits the wireless signal to the processor 111.

For example, the processor 211 of the light emitting tag 2 transmits a wireless signal corresponding to the atmospheric pressure measured by the second atmospheric pressure sensor 232 to the information processing apparatus 1 by the wireless device 233 included in the output unit 23. That is, the output unit 23 is an example of an output unit having a wireless device that wirelessly outputs the output information. The wireless IF 132 of the information processing apparatus 1 may receive the wireless signal transmitted from the wireless device 233 and transmit the data of the atmospheric pressure indicated by the wireless signal to the processor 111. That is, the processor 111 is an example of a processor that acquires the output information on the basis of a reception signal received from the wireless device.

<4>

In the above-described exemplary embodiment, the light emitting element 231 included in the output unit 23 of the light emitting tag 2 outputs a signal obtained by encoding the identification information of the light emitting tag 2 according to a light emitting pattern and an emission wavelength, but the signal may be output by another method.

For example, the processor 211 of the light emitting tag 2 wirelessly transmits, from the wireless device 233, a signal indicating the start and end timings together with a signal indicating the identification information of the light emitting tag 2. Then, the light emitting element 231 may emit light during the period from the start to the end. In a case where a plurality of light emitting tags 2 exists in the space 8, the light emitting tags 2 may be exchanged wirelessly, and the timing of light emission may be different from each other. Further, the information processing system 9 may include a control device that controls the light emitting tags 2 by wireless communication so that the timings at which the plurality of light emitting tags 2 emit light respectively differ.

The processor 111 of the information processing apparatus 1 receives the identification information of the light emitting tag 2 and the notification of the start and end timings from the wireless device 233 of the light emitting tag 2 via the above-described wireless IF 132. Then, the processor 111 may specify a two-dimensional coordinate of the bright spot of the light emitting tag 2 that has emitted light from the image captured by the imaging device 4 during the period from the start to the end, and associate the two-dimensional coordinate with the above-described identification information.

<5>

In the above-described exemplary embodiment, in a case where the plurality of light emitting tags 2 exist in the space 8 and need to be identified, the light emitting tag 2 transmits the identification information to the information processing apparatus 1 using the light emitting element 231, but may transmit the identification information to the information processing apparatus 1 without using the light emitting element 231. For example, an identification image such as a one-dimensional barcode or a two-dimensional barcode may be printed on the light emitting tag 2. The processor 111 of the information processing apparatus 1 may extract the identification image from the image acquired from the imaging device 4 and analyze the identification image to identify the light emitting tag 2.

<6>

Although the above-described information processing apparatus 1 includes the control unit 11 that has the processor 111 and the memory 112, and controls each unit, but a control means that controls the information processing apparatus 1 may have another configuration. For example, the information processing apparatus 1 may include various processors in addition to the CPU.

In addition, the above-described light emitting tag 2 includes the control unit 21 that has the processor 211 and the memory 212 and controls each unit, but a control means that controls the light emitting tag 2 may have another configuration. For example, the light emitting tag 2 may include various processors in addition to the CPU.

The term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

<7>

In the embodiments above, the term "processor 111" is broad enough to encompass one processor 111 or plural processors in collaboration which are located physically apart from each other but may work cooperatively. The order of operations of the processor is not limited to one described in the embodiments above, and may be changed.

<8>

A program executed by the processor 111 of the control unit 11 of the information processing apparatus 1 described above is an example of a program for causing a processor included in a computer to execute a process, the process including acquiring an image obtained by imaging space by one imaging device fixed in the space, specifying, in the image, a two-dimensional coordinate of a bright spot indicating light emission of a light emitting device moving in the space, acquiring output information output by an output unit included in the light emitting device, and specifying a three-dimensional coordinate in the space of the light emitting device from the output information and the two-dimensional coordinate. The program can be provided in a state stored in a recording medium readable by a computer device, for example, a magnetic recording medium such as a magnetic tape and a magnetic disk, an optical recording medium such as an optical disk, a magneto-optical recording medium, a semiconductor memory, or the like. In addition, the program may be downloaded via a communication line such as the internet.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus, comprising:
a processor configured to:
acquire an image obtained by imaging a space and a light emitting device moving in the space by one imaging device fixed in the space;
specify, in the image, a two-dimensional coordinate of a bright spot generated by light emission of the light emitting device moving in the space;
acquire output information output by the light emitting device; and
specify a three-dimensional coordinate in the space of the light emitting device based on the output information and the two-dimensional coordinate,
wherein the processor is configured to specify the three-dimensional coordinate by determining a first component and a second component of the three-dimensional coordinate based on the two-dimensional coordinate of the bright spot and a third component of the three-dimensional coordinate based on the output information, wherein the output information includes information corresponding to a position of the light emitting device in the space.

2. The information processing apparatus according to claim 1,
wherein the light emitting device includes a light emitting element that outputs the output information by the light emission, and
wherein the processor is configured to acquire the output information from the image obtained by imaging the light emission by the light emitting element.

3. The information processing apparatus according to claim 2,
wherein the processor is configured to
acquire a plurality of images of the space imaged by the imaging device at different times; and acquire the output information indicated by a light emission pattern based on the plurality of images.

4. The information processing apparatus according to claim 1,
wherein the light emitting device includes a wireless device that wirelessly outputs the output information, and
wherein the processor is configured to acquire the output information based on a signal received from the wireless device.

5. The information processing apparatus according to claim 1, wherein the processor is configured to acquire the output information transmitted from the light emitting device through the light emission of the light emitting device obtained from the image.

6. A non-transitory computer readable medium storing a program for causing a processor included in a computer to execute a process, the process comprising:
acquiring an image obtained by imaging a space and a light emitting device moving in the space by one imaging device fixed in the space;
specifying, in the image, a two-dimensional coordinate of a bright spot generated by light emission of the light emitting device moving in the space;
acquiring output information output by the light emitting device; and
specifying a three-dimensional coordinate in the space of the light emitting device based on the output information and the two-dimensional coordinate,
wherein the processor is configured to specify the three-dimensional coordinate by determining a first component and a second component of the three-dimensional coordinate based on the two-dimensional coordinate of the bright spot and a third component of the three-dimensional coordinate based on the output information, wherein the output information includes information corresponding to a position of the light emitting device in the space.

* * * * *